Oct. 31, 1967  E. W. SCHLIEBEN  3,350,035
VTOL WITH CYLINDRICAL WING
Filed Aug. 19, 1964  6 Sheets-Sheet 1

INVENTOR

BY Ernest W. Schlieben

Oct. 31, 1967  E. W. SCHLIEBEN  3,350,035
VTOL WITH CYLINDRICAL WING
Filed Aug. 19, 1964  6 Sheets-Sheet 2

INVENTOR
BY *Ernest W. Schlieben*

Oct. 31, 1967     E. W. SCHLIEBEN     3,350,035
VTOL WITH CYLINDRICAL WING

Filed Aug. 19, 1964     6 Sheets-Sheet 3

INVENTOR
BY Ernest W. Schlieben

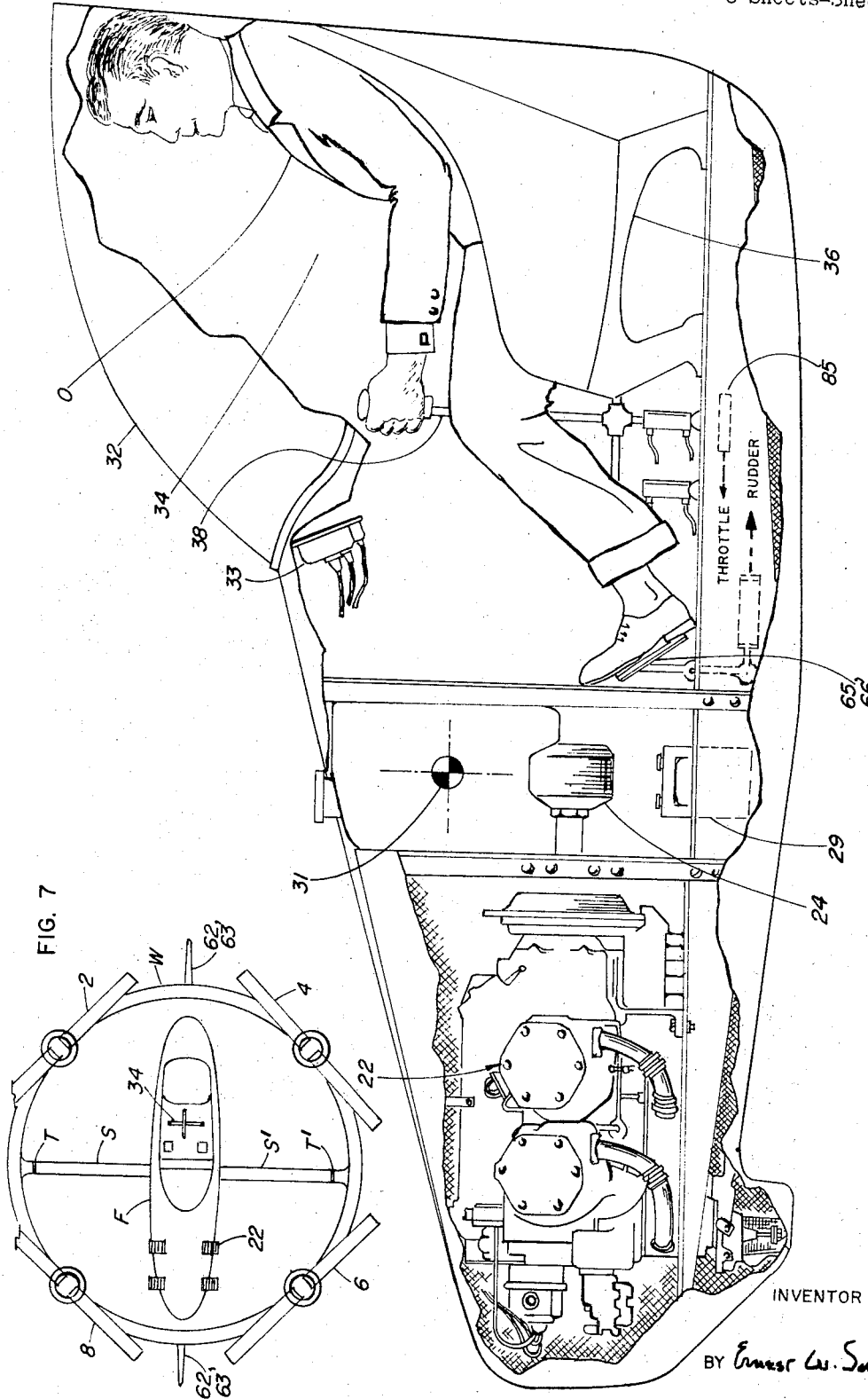

Oct. 31, 1967  E. W. SCHLIEBEN  3,350,035
VTOL WITH CYLINDRICAL WING
Filed Aug. 19, 1964  6 Sheets-Sheet 5
FIG. 9
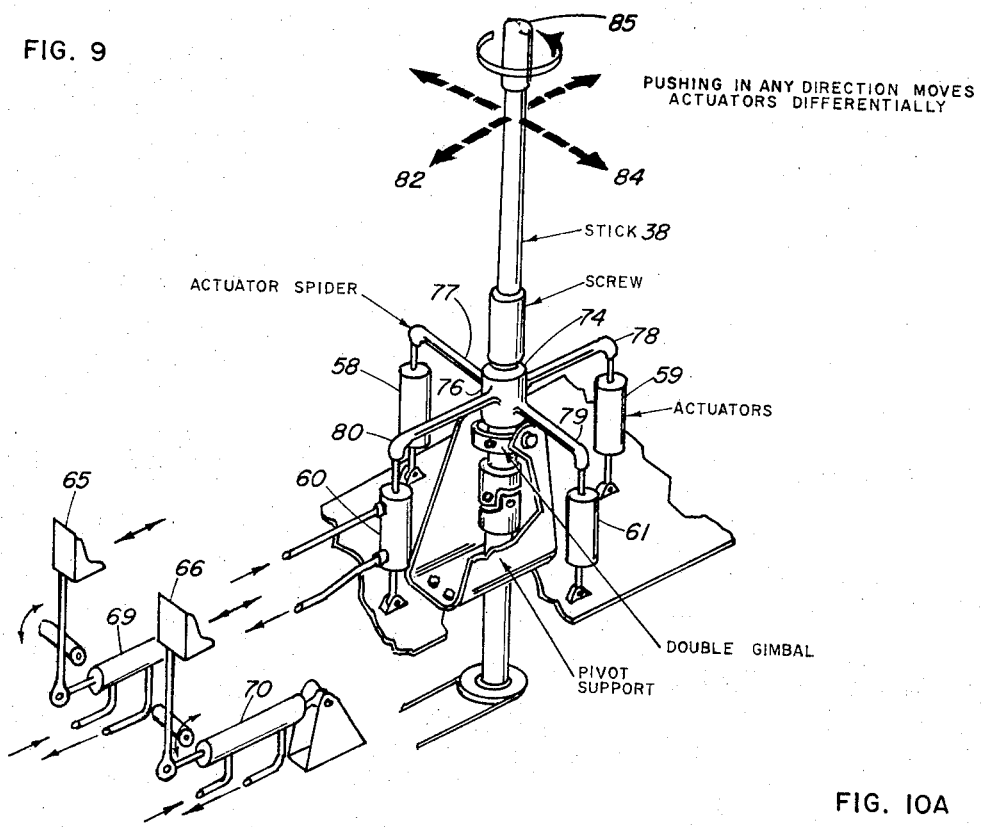
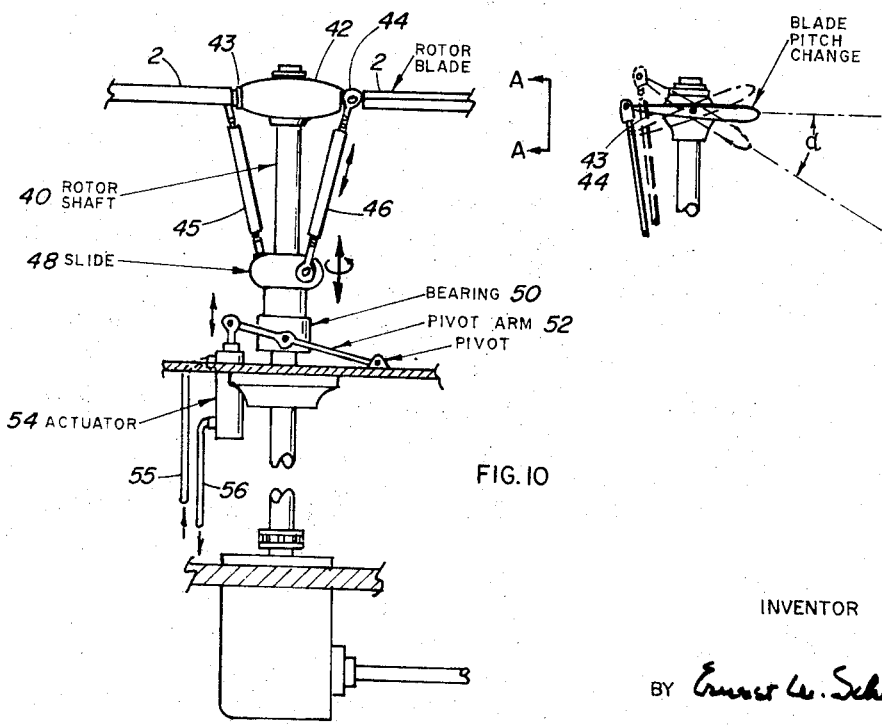
FIG. 10  FIG. 10A
INVENTOR
BY Ernest W. Schlieben Oct. 31, 1967  E. W. SCHLIEBEN  3,350,035
VTOL WITH CYLINDRICAL WING
Filed Aug. 19, 1964  6 Sheets-Sheet 6

| FLIGHT PATH | AIRPLANE AXIS | ROTATION ABOUT AXIS | MOTION ALONG AXIS |
|---|---|---|---|
| VERTICAL | X | Δ-ROTOR PAIRS AC & BD | Δ-ROTOR PAIRS AB & CD |
| VERTICAL | Y | Δ-ROTOR PAIRS AB & CD | Δ-ROTOR PAIRS AC & BD |
| VERTICAL | Z | USE OF RUDDER | Σ-ROTORS A, B, C, D |
| HORIZONTAL | X | USE OF RUDDER | Σ-ROTORS A, B, C, D |
| HORIZONTAL | Y | Δ-ROTOR PAIRS CD & AB | Δ-ROTOR PAIRS AC & BD |
| HORIZONTAL | Z | Δ-ROTOR PAIRS AC & BD | Δ-ROTOR PAIRS CD & AB |

FIG. 12

LEGEND:
A,B,C,D = ROTOR THRUST FORCES
Δ = DIFFERENTIAL THRUST
Σ = SUMMATION OF THRUST
X,Y,Z = AIRCRAFT AXES

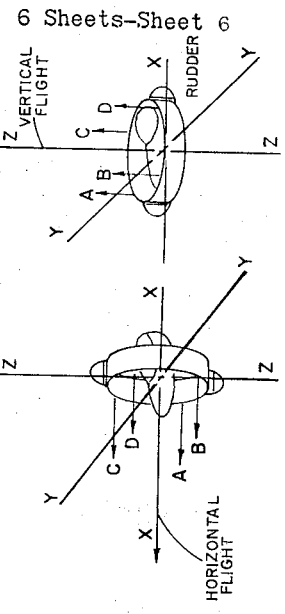

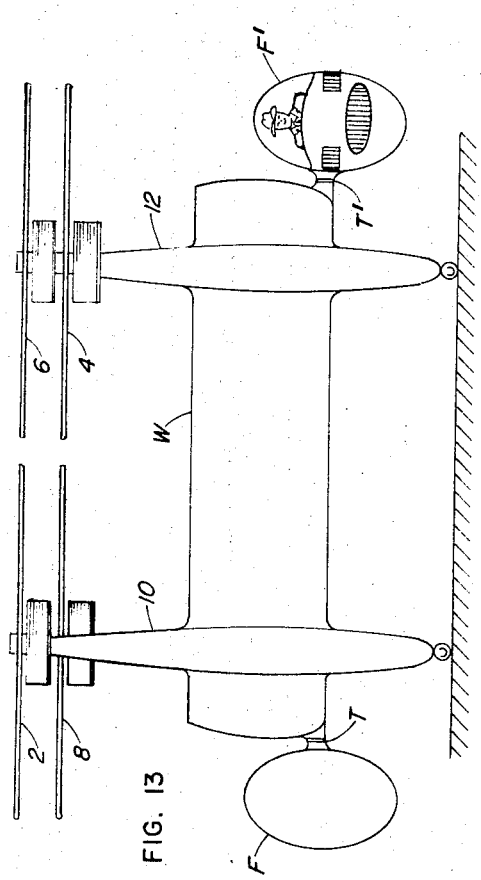

FIG. 13

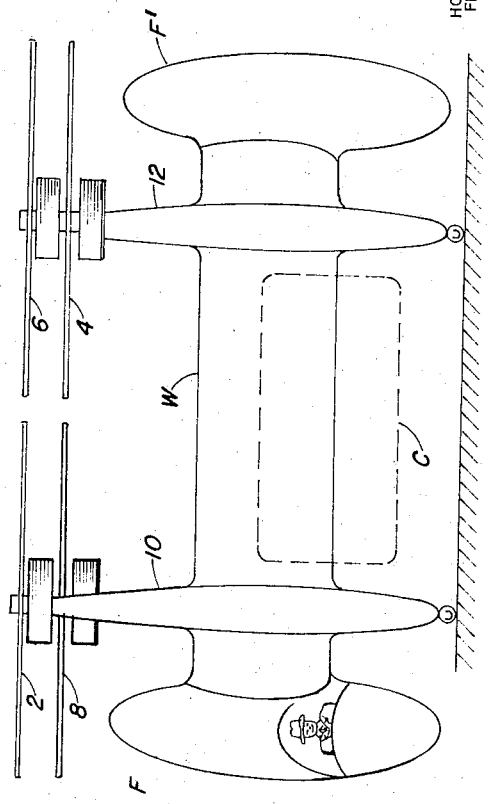

FIG. 14

INVENTOR
BY Ernest W. Schlieben

United States Patent Office 3,350,035
Patented Oct. 31, 1967

3,350,035
VTOL WITH CYLINDRICAL WING
Ernest W. Schlieben, 3 Arborlea Ave.,
Morrisville, Pa. 19067
Filed Aug. 19, 1964, Ser. No. 390,762
24 Claims. (Cl. 244—7)

The aircraft comprising this invention is similar in many respects to the one described in the specification for Patent 2,868,476—Convertiplane with Tiltable Cylindrical Wing, Jan. 13, 1959, with the following differences:

(1) The aircraft in this invention is a pusher version whereas a tractor version is shown in the referenced patent. The rotors in this invention are mounted behind wing. There are also added fixed stabilizing surfaces which may function to return the airplane to its undisturbed attitude in forward flight if the aircraft is disturbed from that position. There are provided also additional devices for aircraft directional control in vertical flight and roll control in forward flight.

(2) The aircraft comprising this invention converts by "coasting downhill" into forward flight whereas the referenced aircraft climbs into forward flight. The aircraft of this invention also "coasts downhill" to reconvert to vertical flight from horizontal flight contrasted to the referenced aircraft which climbs to convert from horizontal to vertical flight.

(3) Another difference lies in the effective use of the rotors as aircraft stabilizing devices. By mounting the rotors behind the wing, the rotor forces which arise in the plane of the rotors in yaw and pitch during aircraft horizontal flight, can be utiilzed to produce static and dynamic restoring forces to overcome the effects of external disturbances acting on the aircraft to displace it from its equilibrium flight condition. The rotors, therefore, act in much the same manner as the fixed tail surfaces on a fixed wing aircraft. Therefore, the rotors serve to perform three functions: propel, aircraft attitude control, and aircraft stabilization.

With these important differences, it can be appreciated that a new type of vertical riser aircraft configuration forms the subject matter of the present invention. This aircraft will be referred to as a tilt-wing vertical take-off and landing aircraft, or simply "VTOL." Throughout the specification the "VTOL" described includes a fuselage, or fuselages, a continuous wing member to provide lift, connected to the fuselage(s), and thrust means attached to the wing, to provide an improved form of aircraft whereby the thrust devices not only sustain the aircraft in vertical flight and propel it in horizontal flight, but also provide forces to tilt the wing, achieve aircraft attitude control and stabilize the aircraft in flight.

It is well known in the art to combine means for providing vertical take off with additional means for accomplishing propulsion along any desired direction and I am aware that such forms of aircraft have been proposed and referred to as VTOL's. However, these earlier structures, while designed to approach in performance the helicopter on the one hand and the fixed wing type of aircraft on the other, have not succeeded in approaching the performance of each type. In all cases, existing VTOL's suffer from a severe weight penalty and undesirable flying qualities.

It is a general object of this invention to improve VTOL aircraft performance through a unique VTOL configuration that retains all the desirable features of the helicopter as well as those of the fixed wing type of aircraft and therefore virtually equals the performance of both a helicopter and a fixed wing type airplane each of the same weight and power, with little penalty in weight, complexity, or degradation of flying qualities.

Another object is to device a VTOL configuration of simplified and efficient nature so that the aircraft can be safely operated by a pilot even if the arcraft is equipped with only one power source. Safe operation is also enhanced by good visibility, a wide landing base, no stall of the wing even at high angles of attack, simplification of control means, and a capability for autorotating power off descent in the event of power failure.

Still another object of the invention is to design a VTOL having a single set of controls for all flight regimes and a fuselage which may be maintained substantially horizontal while the wing tilts, or, if the aircraft application dictates, remains fixed to the wing and tilts with the wing.

These and other objects and novel features will be apparent from the following detailed description of the invention.

An evaluation of possible ways in which the foregoing objectives might be realized has led to the basically novel concept of combining power-driven rotor blades with a closed, substantially cylindrical lift wing in such a way as to provide for propulsion aircraft attitude control and stabilization all combined in the thrust means. I have further conceived of at least one practical embodiment in which the lift wing is pivotally mounted or hinged to a fuselage so that the wing may tilt with respect to the fuselage to accomplish vertical take-off as well as flight in a horizontal direction whilst maintaining a horizontal fuselage attitude. One simple form of the invention has been illustrated in the accompanying drawings, in which:

FIG. 6 is a greatly enlarged view of a typical fuselage showing somewhat in detail the power drive means and control mechanism for operating the VTOL.

FIG. 7 is a plan view of the VTOL of the invention.

FIG. 9 is a detail perspective view of the control mechanism for the power drive employed to propel the VTOL.

FIG. 10 shows details of the rotor pitch control mechanism.

FIG. 10A is another detail view, partly in cross-section, showing parts of the rotor pitch control mechanism.

FIG. 12 is a table of the control forces used to effect translation and rotation of the VTOL.

FIGS. 12A and 12B show diagrammatically the thrust forces listed in the table of FIG. 12.

FIGS. 13 and 14 are front views of other possible fuselage locations. It will be understood that the fuselage locations shown are all acceptable in that they do not in any way degrade the performance of this VTOL, but are chosen to show that such arrangements may be made to satisfy different aircraft applications and missions. For example, cargo, C, in large containers occasionally may be slung within the wing and carried from one place to another without changing the attitude of the aircraft from its normal vertical take-off attitude. Such an arrangement would make a lifting "crane" of the aircraft and would lead to the more convenient location of the pilot compartment outside of the wing. FIGS. 13 and 14 show views of "outside" fuselages that may be pivotally or fixed mounted.

It will be understood that the forms of the invention illustrated in FIGS. 1–14 are intended to be representative of greatly simplified forms of aircraft construction involving principles and operation characteristics capable of being embodied in a wide range of more elaborate and complicated mechanisms to satisfy a range of requirements and conditions.

Figure 1:
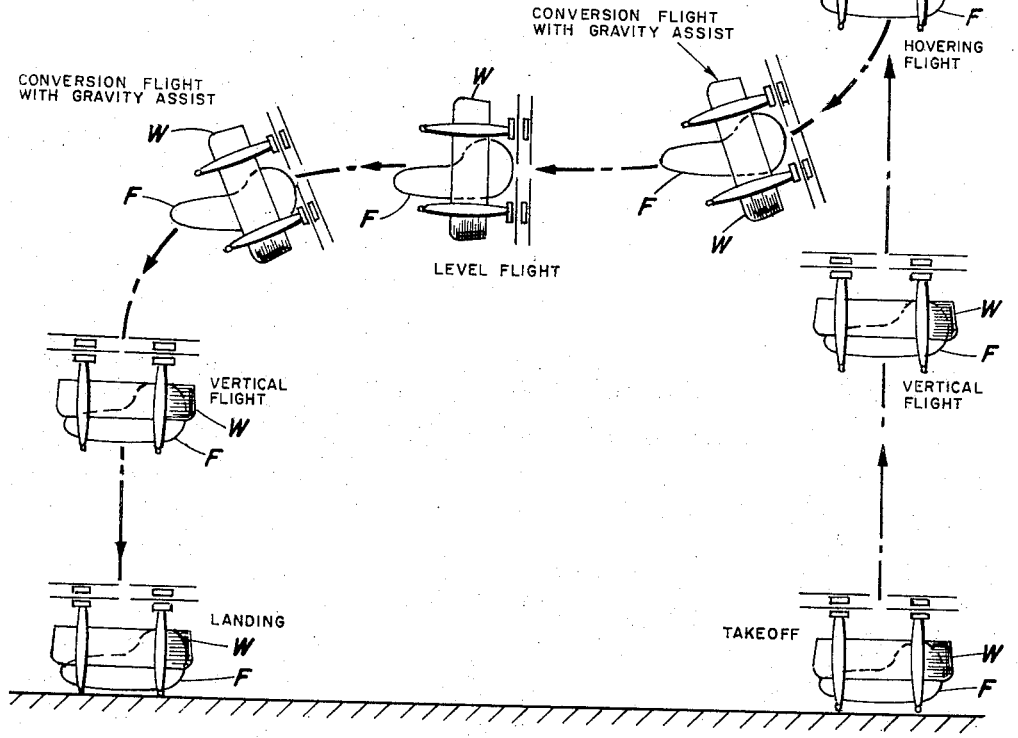
FIG. 1 is a diagrammatic view showing schematically the convertiplane of the invention in various positions starting from a ground position, then rising in a substantially vertical take-off, then "coasting downhill" into horizontal flight, then coasting back into vertical flight, and finally descending along a vertical path to a landing point.
Figure 2:
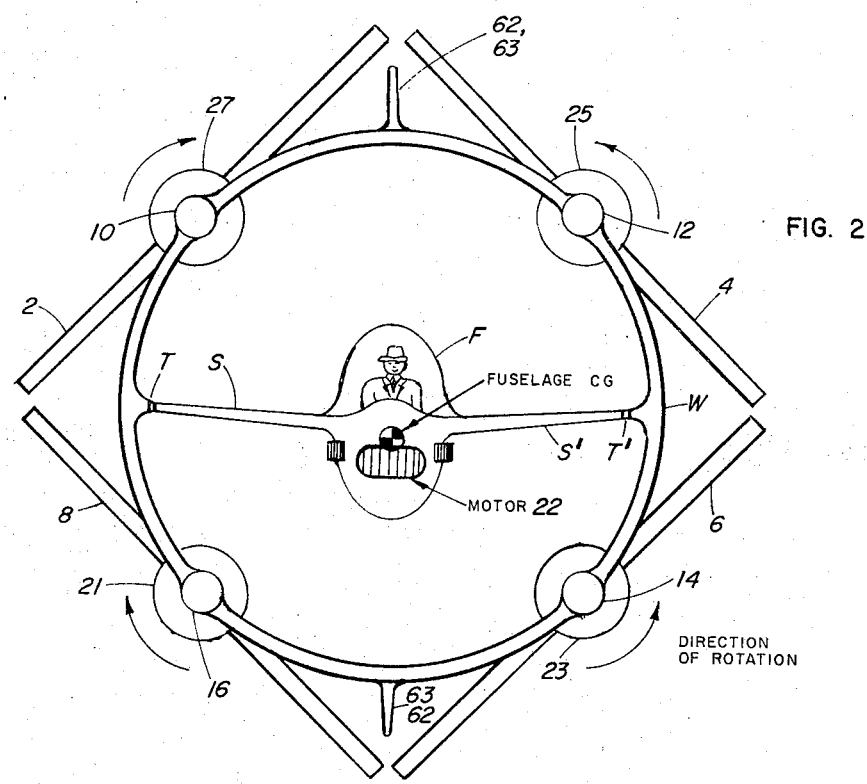
FIG. 2 is a front elevational view of the VTOL showing somewhat schematically a fuselage having a lift wing supported thereon in hinged relationship and a plurality of thrust devices located on the lift wing member.
Figure 4:
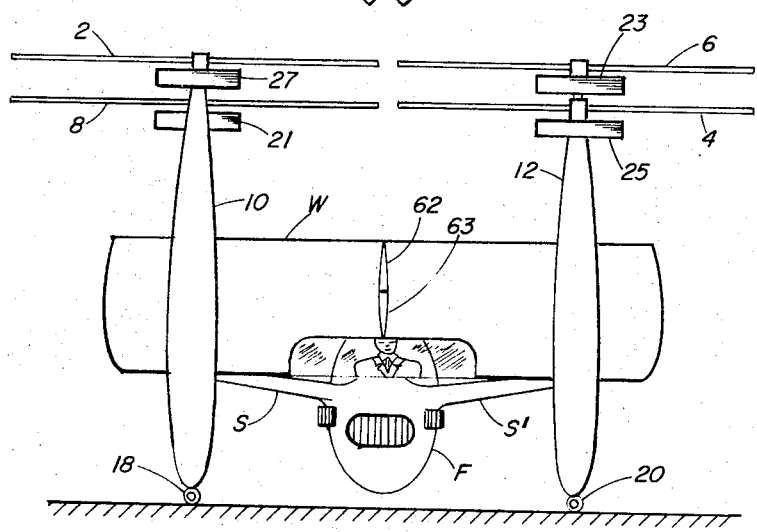
FIG. 4 shows the same VTOL configuration in a landing position viewed from a point directly in front of the fuselage.

Referring in detail to the simplified form of VTOL structure shown in FIGS. 1–5 and 13, F denotes a fuselage to which may be rigidly secured, for example, a pair of wing support members S and S'. These support members project outward from either side of the fuselage, as best shown in FIG. 2 and at their outer extremities may pivotally receive trunnions T and T'. Secured to the trunnions by bolting, welding or other means is a lift wing member W which, in one preferred form, is of hollow construction and comprises a continuous substantially circular body, as is best shown in FIG. 2. It will be understood that the wing may be of various other desired closed shapes.

It will be observed that, by means of the arrangement described, the wing is, in effect, hinged to the fuselage and, thus, has a single degree of freedom relative to the fuselage. In accordance with the invention, I provide at spaced apart points along the wing W a plurality of thrust devices consisting, for example, of variable pitch rotor blades as 2, 4, 6, and 8, rotatably mounted on rotor nacelles as 10, 12, 14, and 16. It is to be understood that the rotors mounted in this manner, in addition to providing thrust and forces to change the attitude of the aircraft, also stabilize the aircraft in the same way the horizontal and vertical fixed tail surfaces do on a fixed wing aircraft in flight. If the aircraft encounters a disturbing gust or other external force which creates a momentary rotational displacement of the aircraft, the rotors will experience forces, in the plane of rotation that act inward towards the center line of the aircraft, thus returning the aircraft to its original position. These forces are present with the rotors receiving power from the drive shafts or in receiving power from the air stream as they do in the brake windmill state when the rotors are dragged through the air. Also shown are stabilizing fixed sufaces 21, 23, 25, 27, on the rotor nacelles which may be used to aid the rotors in stabilizing the aircraft. It is to be understood, however, that these are purely subsidiary devices to the rotors and need not appear in most designs. In a normal landing position of the VTOL, the wing W may assume an attitude such that its rotor blades extend in a substantially horizontal plane. In this landing position, the VTOL is designed to rest upon a landing gear, which may, for example, consist of pneumatic cushions or pads as 18 and 20 received on the lower ends of extensions of the nacelles 10, 12, 14, and 16.

Figure 3:
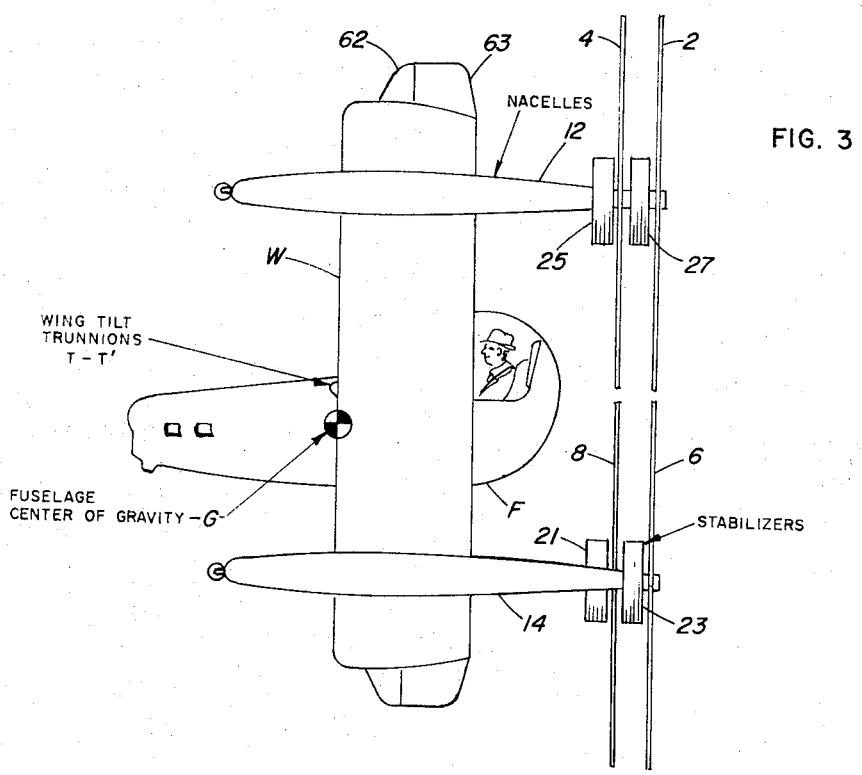
FIG. 3 is a side elevational view illustrating schematically the same general arrangement shown in FIG. 2 and particularly the normal horizontally disposed position of the fuselage, fixed stabilizing rings or surfaces mounted on the rotor nacelles, and a rudder and fixed fin mounted on the wing.
Figure 5:
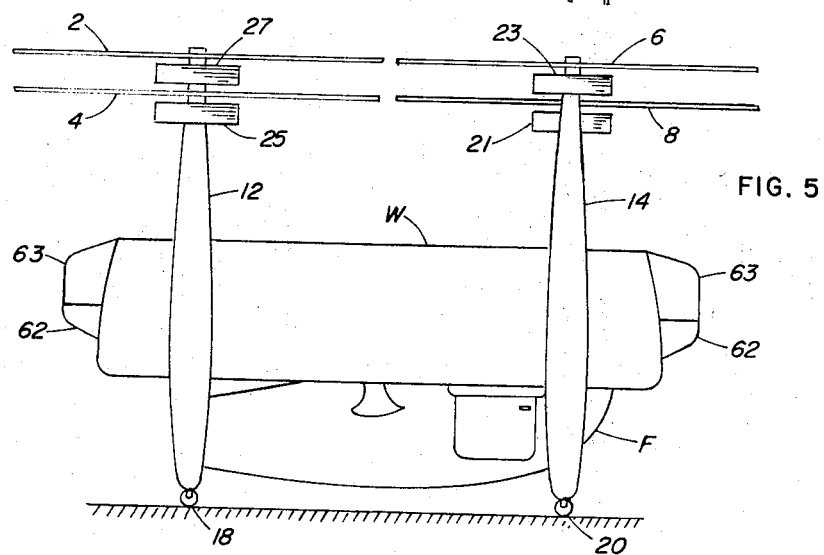
FIG. 5 is another view similar to FIG. 4 showing the VTOL in a landing position but viewed from a point at one side of the fuselage.

I further arrange the fuselage F in relation to the wing W so that, when the VTOL is in the ground attitude of FIGS. 1, 4, 5, and 13, for example, the center of gravity G of the fuselage will lie below the trunnion axis T–T' as indicated in FIG. 3, and will always assume a substantially horizontal position due to the pendulous arrangement as shown in FIG. 3. It is to be understood, however, that if a large center of gravity shift is desired, this free swinging feature can be discarded for a positively driven wing tilt mechanism to insure a horizontal fuselage position in all flight regimes.

The closed wing, shown throughout, is a superior structure and aerodynamic device compared to a conventional wing used on fixed wing aircraft in several respects. It transmits no bending moments to the fuselage and is structurally stiffer than a straight wing. Aerodynamically the closed wing can be designed to exhibit little or no pitching moment about its aerodynamic center. Also it can be designed to exhibit no definite stalling angle of attack as does a conventional flat wing. From a safety point of view therefore, it is a superior aerodynamic device to the straight fixed wing which exhibits a well defined stall and poses an ever-present threat to safety.

The rotor blades 2, 4, 6, and 8 may be of two bladed construction or may be comprised of more blades and may be actuated by some suitable power drive such as a gear and shaft transmission from a motor mounted within the fuselage, as has been shown somewhat in detail in FIG. 6. The power supply, however, need not be located in the fuselage but can be mounted on the wing, particularly in larger VTOL as in multi-engine aircraft. For example, the engines could be located in the fuselages F and F' as shown in FIG. 13. Power can be supplied to each rotor through a mechanical transmission or some other desired type. The blades of each rotor are locally controllable in pitch through separate control mechanisms which may comprise any one of a number of well known means to obatin pitch rotation of blades.

The fuselage F, shown in some detail in FIG. 6, comprises a structure conforming to conventional design practice and includes a canopy 32 which overlies a pilot's cockpit 34. In the cockpit is located a pilot's seat 36 adjacent to which is a control stick 38, rudder pedals 65 and 66 and throttle 85, through which the pilot O manipulates the controls of the VTOL. Operating conditions in the aircraft are observed visually and by means of the instruments located in the cockpit and on the instrument panel 33. FIG. 6 is intended to show also the power drive somewhat diagrammatically wherein numeral 22 denotes a motor which actuates a gear box 24 connected through shafting to other gear boxes (not shown) which power the rotor shafts. A fuel tank 31 for the motor 22 is located immediately above a battery 29.

Figure 8:
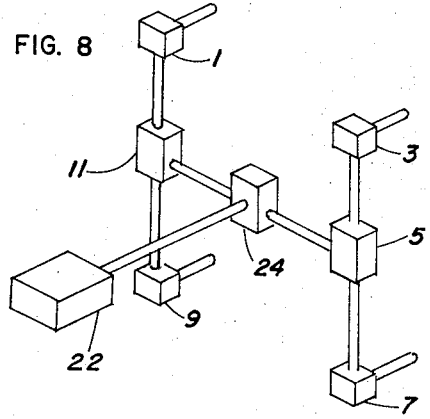
FIG. 8 shows the power transmission general arrangement.

The motor transmission operates through the gear boxes shown in FIG. 8 and denoted as 1, 3, 5, 7, 9, 11 and 24. The power is, therefore, individually conveyed to each rotor 2, 4, 6, 8. One illustrative gear box and rotor driving shaft arrangement has been illustrated in FIG. 10 in which the numeral 40 denotes the rotor shaft to which is secured the rotor blades 2 and on this shaft 40 is a hub 42. Considering one typical pitch control mechanism, numerals 43 and 44 indicate pitch control arms which are operated by pitch control rods 45 and 46. These rods are attached to a slide member 48 on the shaft 40 and the slide includes a bearing member 50 to which is pivotally attached a pivot arm 52 under the control of a pivot arm actuator 54. Here also it is intended that the simplified arrangement indicated is set forth for purposes of illustrating one workable form of the invention and it may be desired to employ various other types of driving arrangements.

The pivot arm actuator 54 may be hydraulically or mechanically actuated through separate control lines 55 and 56 which connect with similar lines provided on each one of a set of actuators 58, 59, 60, and 61 forming part of a spider rod mechanism illustrated in FIG. 9.

The control mechanism shown in FIG. 9 may, for example, include the actuators 58, 59, 60, 61 already referred to, and the vertical control stick 38. At its intermediate portion the control stick 38 may be provided with a threaded section 74 which is in threaded engagement with a bearing support 76 which has received thereon in transversely disposed relationship arms as 77, 78, 79, and 80. By means of the arrangement described, therefore, it will be appreciated that twisting one segment of the top of control stick 38 about a vertical axis operates all of the actuators 58, 59, 60, and 61 at once. Also, if the pilot pushes the control stick in any direction, four of which are indicated by the arrows 82, and 84, the actuators 58, 59, 60, and 61 may be differentially operated thus causing similar differential displacement of the control rods 45 and 46 at the rotor pitch mechanisms. Thus, control in any direction, through the use of differential thrust forces which appear at each of the rotors, is exercised on the whole aircraft. As is the case with the rotor drives, it is intended that this control stick mechanism may be varied in many respects but is intended to constitute one simple means of carrying into effect the unique arrangement of the invention in its broader aspect. Throttle control may be obtained by twisting the other segmented portion 85 of control stick 38 to turn the throttle pulley 85 at the lower end of the stick.

In operation, assuming the VTOL is at rest, a sufficient motor speed is attained to drive the rotor blades in the position shown at the lower right hand side of FIG. 1 with the rotor blades normally rotating in a horizontal plane. The rotors produce thrust which lifts the VTOL for vertical take-off and climb. As soon as the desired altitude is reached, a transition from vertical to forwardly directed flight is carried out, with most of VTOL weight being carried by the rotors until forward flight speeds are attained, when virtually all the aircraft weight is sustained by the wing as it is in any fixed wing aircraft. The transition is carried out by reducing the collective pitch on all rotors to cause a downward vertical movement of the aircraft through loss of rotor thrust and by tilting the wing to a positive angle of attack by using differential thrusts at the rotors. In "coasting downhill," the aircraft will pick up speed and its flight path will depart from the vertical due to wing lift normal to the instantaneous flight path. At the same time the collective pitch of all the rotors is gradually reversed to cause the rotors to become pusher thrusters instead of tractor, or puller, thrusters as they are in the vertical flight regime. The net result is that the aircraft can be made to take a self sustaining horizontal flight position after the loss of some altitude as is shown in FIG. 1.

Thus it can be seen that the rotors serve to provide for lift, for control of aircraft attitude, to tilt the wing and finally as discussed earlier, to stabilize the aircraft in forward flight. If, in the event of power failure during vertical flight, conversion from vertical to horizontal flight, horizontal flight conversion back to vertical flight, and descending vertical flight, a safe recovery to vertical flight and to landing can be effected by changing rotor pitch to an autorotating setting, in which upward thrust is obtained by converting the aircraft potential energy to driving energy for the rotors. In autorotating descent, the pilot may exercise full control of the rotor thrusts as previously described and may effect a soft landing by sharply increasing the pitch of the rotors as he nears the ground, thereby realizing extra lift, or decelerating force, by drawing on the stored kinetic energy in the blades.

Figure 11:
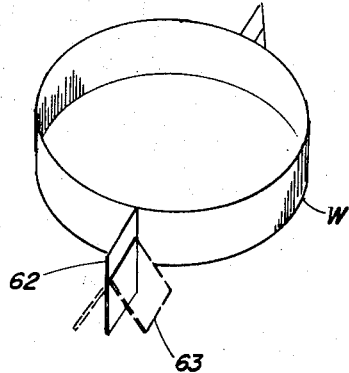
FIG. 11 shows the fixed fin and rudder mounted on the wing for directional and roll control.

The remaining aerodynamic control, used for directional control in vertical flight and roll control in forward flight is obtained through use of the rudder 63 shown in FIG. 11. This aerodynamic control surface may be operated through the use of the foot pedals shown in FIG. 9 using the same type of actuators, 69 and 70, as used for the rotor controls. The form of the control shown is merely illustrative and may be accomplished by the use of jets driven by compressed air, steam, fans, etc., all producing forces in the same direction as the rudders. The fins 62, shown in FIG. 11, are fixed surfaces that damp aircraft motions about the wing axis.

From the foregoing description, it will be evident that I have disclosed a unique aircraft construction of the VTOL class which is characterized by many advantages. There is realized a minimum of vibration since the rotors are never subjected to large yaw forces as they are in helicopters and many VTOL and therefore cannot experience large periodic thrust and drag variations. Realized also is the unique use of the rotors for three functions: propulsion, attitude control, and stabilization. The use of the rotors for aircraft stabilization, eliminates the need for a conventional tail as found on fixed wing aircraft. The use of the ring wing also completely avoids the dangerous stall condition encountered in fixed wing aircraft since the ring wing can be designed to provide lift, without stalling, up to very high angles of attack. Also the ring wing provides an excellent base on which to mount rotors and landing gear and even a fuselage. Further, the aforementioned advantages are obtained with mechanical simplicity as compared to previous VTOL's including the helicopter. It may be noted also that the landing gear and wing may be readily used for flotation in sustaining the aircraft in water landing.

Having described my invention, what I claim is:

1. A VTOL aircraft construction comprising a lifting airfoil closed upon itself to form a continuous wing of annular shape, at least one fuselage secured to said wing, at least one power source secured to said wing, plural controllable pitch rotors located to the rear of said wing, transmission means to distribute the power to the plural controllable pitch rotors disposed around the trailing edge of the wing, to provide thrust, aircraft attitude control and automatic stabilization, and landing gear attached to the leading edge of the wing and arranged around its periphery.

2. A structure according to claim 1 in which fixed areodynamic surfaces mounted on rotor shaft housings secured to and located to the rear of the trailing edge of the lift wing member are provided to aid the rotors in stabilizing the aircraft in pitch and yaw in forward flight.

3. A structure according to claim 2 in which at least one fin and at least one rudder are mounted on the wing for the purpose of exerting positive directional control force on the aircraft in vertical flight and roll control forces in horizontal flight.

4. A structure according to claim 3 in which a mechanism located in at least one fuselage containing a cockpit is arranged to control the pitch, collectively and differentially, of each rotor, a second mechanism is located in the cockpit to control the operation of the power source, and a third mechanism is located in the cockpit for the control of the aircraft direction and roll motions in vertical and horizontal flight respectively.

5. A VTOL aircraft comprising a short circular cylindrical wing of substantially toric section having leading and trailing edges, at least one fuselage and at least one power source secured to the wing, plural thrust means comprising controllable pitch bladed rotors attached to the trailing edge of the wing for propulsion, aircraft attitude control, and aircraft automatic stabilization, aerodynamic surfaces mounted on the wing for wing yaw control in vertical flight and roll control in horizontal flight, a mechanism located in the cockpit to control the pitch, collectively and differentially, of each rotor set of blades, a second mechanism in the cockpit to control the operation of the power source, a third mechanism located in the cockpit for the control of wing yaw and roll devices, augmenting stabilizing means to aid the rotors in stabilizing the aircraft in pitch and yaw in forward flight in the form of fixed aerodynamic surfaces located to the rear of the trailing edge of the wing, and a flight conversion mode, from vertical to horizontal or horizontal to vertical flight paths, that permits a "coasting downhill" mode of conversion with arbitrarily chosen power expenditure including the option of no power.

6. A VTOL aircraft comprising a continuous airfoil closed upon itself to form a wing of annular shape, at least one cockpit equipped fuselage and at least one power source secured to said wing, plural thrust means comprising controllable pitch bladed rotors attached to the trailing edge of the wing for: propulsion, attitude control and aircraft automatic stabilization, landing gear attached to the leading edge of the wing and distributed around its periphery, devices on the wing for the purpose of exerting positive directional control on the airplane in vertical flight and roll control on the airplane in horizontal flight, augmenting stabilizing means to aid the rotors in stabilizing the aircraft in pitch and yaw in forward flight in the form of fixed aerodynamic surfaces located to the rear of the trailing edge of the wing and configured like the wing, a mechanism located in the cockpit to control the pitch collectively and differentially of each set of rotor blades, a second mechanism in the cockpit to control the operation of the power source, a third mechanism in the cockpit for the control of the wing in yaw and roll in vertical and horizontal flight respectively, and a flight procedure for conversion to and from horizontal flight whereby the aircraft glides "downhill," power-off or power-on, at below wing stall angle of attack and at low rotor angles of yaw.

7. A VTOL aircraft comprising a lift wing member having a hollow, substantially cylindraceous lift body including a trailing edge, rotary means for propelling said member, and means for supporting said propelling means at a distance behind said member trailing edge to enable said propelling means to effect a desired degree of automatic attitude stabilization of said lift wing member, and at least one fuselage secured to said lift wing member.

8. A structure according to claim 7 in which said rotary means for propelling said lift wing member include blade propellers to effect active attitude control of the lift wing member around two axes.

9. A structure according to claim 8 including means to prevent the stall of said lift wing member and to exhibit stabilizing positive pitching moments in all conversion and horizontal flight attitudes.

10. A structure according to claim 9 including additional stabilizing means subsidiary to the propelling means, to automatically further stabilize said lift wing member, and means for securing said additional means behind the trailing edge of said lift wing member.

11. A structure according to claim 10 including means secured to said lift wing member for controlling the attitude of said lift member around one axis.

12. A structure according to claim 11 including pilot control means for said blade propellers and said attitude control means to effect active three axes control of the attitude of the lift wing member.

13. A structure according to claim 12 including landing gear secured to and located forward of the leading edge of the said lift wing member.

14. A VTOL aircraft comprising a lift wing member having a substantially thin, hollow, cylindrical lift body, of which cross sections lying in planes containing said lift body cylinder axis are airfoil sections, propelling means secured to said lift member and located behind the trailing edge of said lift member, said propelling means comprising a plurality of variable pitch blade rotors spaced apart on said lift member, with the rotor axes of rotation substantially parallel to said lift member cylinder axis, means including said propelling means for automatic stabilization of said lift wing member, at least one motor secured to the lift wing member and coupled to the said variable pitch blade rotors, and at least one fuselage secured to the lift wing member.

15. A structure according to claim 14 in which the blade pitch of said variable pitch blade rotors may be actuated collectively to change thrust and actuated differentially to effect yaw and pitch control of the lift wing member in all conversion and horizontal flight attitudes.

16. A structure according to claim 15 including subsidiary stabilizing fixed surface means secured to and located behind the trailing edge of the lift wing member for effecting automatic lift wing member attitude stabilization around the pitch and yaw axes in horizontal and conversion flight.

17. A structure according to claim 16 including at least one fin, and at least one rudder, pivotally mounted on the lift wing member, for providing active attitude control around the cylinder axis of said wing member.

18. A structure according to claim 17 including landing gear attached to the leading edge of said lift member and disposed forward of the leading edge, said land gear comprising at least three elements making ground contact, said landing means comprising shock-absorbent pads and flotation elements for land and water landings, respectively.

19. A structure according to claim 18 including pilot control means including single stick and a rudder-pedal operated mechanism for effecting lift wing member active attitude control around all axes of rotation.

20. A structure according to claim 19 in which said lift wing member airfoil cross-section is substantially symmetrical and substantially parallel to the cylinder axis of the lift wing member, to eliminate stall and realize stabilizing positive pitching moments on the lift wing member in all conversion and horizontal flight attitudes.

21. A VTOL aircraft according to claim 7 in which at least one fuselage and at least one motor is pivotally supported within said wing member, and means for providing a horizontal attitude for said fuselage for all flight conditions.

22. A VTOL aircraft according to claim 7 in which at least one fuselage is rigidly secured to the lift wing member outside the said wing member enclosed volume, and aligned with the minimum drag axis of said fuselage substantially parallel to the lift member axis of symmetry, and at least one motor rigidly secured to said lift member.

23. A VTOL aircraft according to claim 7 in which at least one fuselage is pivotally mounted on the lift wing member outside the enclosed volume of the said lift member, said fuselage being capable of assuming a substantially horizontal attitude independent of the lift member position, and at least one motor rigidly secured to the lift wing member.

24. A VTOL construction according to claim 7 in which at least one fuselage and at least one motor are rigidly secured to the lift wing member outside the lift wing member enclosed volume, the fuselage being aligned with its minimum drag axis substantially parallel to the lift wing member axis of symmetry.

References Cited

UNITED STATES PATENTS

| | | | |
|---|---|---|---|
| 2,868,476 | 1/1959 | Schlieben | 244—7 |
| 2,952,422 | 9/1960 | Fletcher et al. | 244—34 |
| 3,181,810 | 5/1965 | Olson | 244—7 |

FOREIGN PATENTS

| | | |
|---|---|---|
| 77,147 | 1/1948 | Czechoslovakia. |

FERGUS S. MIDDLETON, *Primary Examiner.*

ALFRED E. CORRIGAN, MILTON BUCHLER,
*Examiners.*